United States Patent [19]

Angelbeck et al.

[11] 4,091,274
[45] May 23, 1978

[54] ACTIVE LASER MIRROR SYSTEM

[75] Inventors: Albert Wolcott Angelbeck, Glastonbury, Conn.; Edward Wayne Vinje, Nashua, N.H.; George Robert Wisner, Deep River, Conn.; Ronald Harold Freeman, Delray Beach, Fla.; Harold C. Reynolds, Jr., Palm Beach Gardens, Fla.; Donald Lee Witt, North Palm Beach, Fla.

[73] Assignee: United Technologies Corporation, Hartford, Conn.

[21] Appl. No.: 753,337

[22] Filed: Dec. 22, 1976

[51] Int. Cl.$^2$ ................................................ G01J 1/20
[52] U.S. Cl. ..................................... 250/201; 350/295; 350/310
[58] Field of Search ............. 250/201; 350/27, 161 R, 350/161 S, 295, 310

[56]  References Cited
U.S. PATENT DOCUMENTS 3,261,016  7/1966  Burr .................................. 350/310 X

OTHER PUBLICATIONS

Morrison, "Development Problems of the Primary Mirror for Large Space Telescopes", SPIE Journal, pp. 107-118, May 1970.

Primary Examiner—Lawrence J. Dahl
Attorney, Agent, or Firm—Anthony J. Criso

[57] ABSTRACT

Active laser mirror systems and methods for achieving near diffraction limited transmission of laser radiation by actively controlling a reflective surface are disclosed. The apparatus involved in the active mirror system includes a mirror having a deformable surface, a plurality of actuators attached at preselected locations to the nonreflecting side of the mirror, a control assembly for performing logic and providing drive signals to the actuators and a sensor system. The method of achieving the improved transmission includes setting the contour of a deformable reflective surface in accordance with predetermined data, reflecting the transmitted beam off the surface enroute to the target, optically monitoring the surface to determine operational changes thereon, computing corrective data, and applying appropriate changes to the mirror surface.

1 Claim, 4 Drawing Figures

FIG. 1
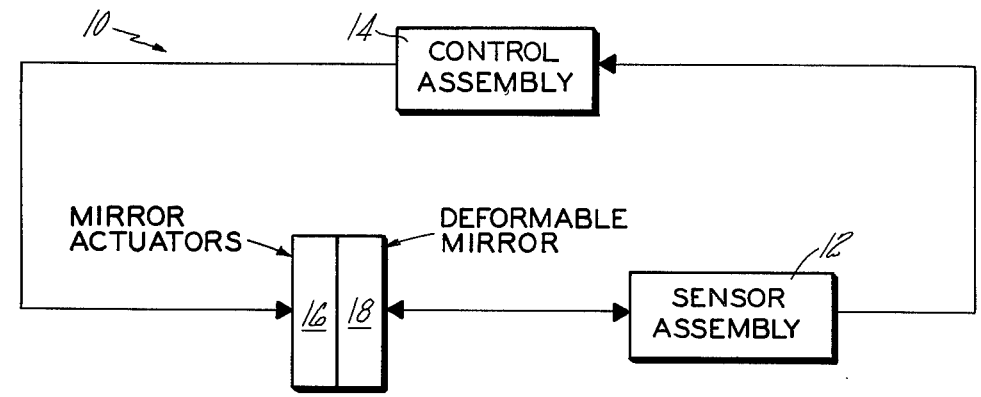
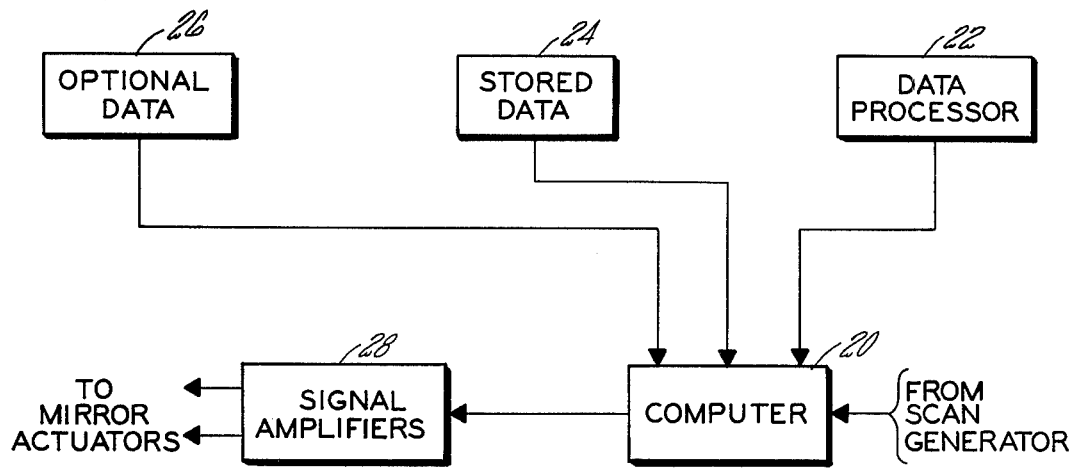
FIG. 2

4,091,274

ACTIVE LASER MIRROR SYSTEM

The invention herein described was made in the course of or under a contract or subcontract thereunder with the Department of the Navy.

BACKGROUND OF THE INVENTION

1. Field of Invention

The present invention relates to lasers and more particularly to systems for actively controlling the surface of a laser mirror.

2. Description of the Prior Art

In systems requiring the transmission of laser radiation, the intensity of the beam at the point of ultimate utility is often very important. The success or failure of some applications may be determined completely by whether the intensity of the laser radiation reaching the target complies with at least some minimum criteria. Fundamentally, the phase of laser beam is subject to distortion by events occurring inside the generating mechanism which may be an oscillator or amplifier or a combination thereof or events that occur during propagation of the beam from the point of origin to the target.

One technique for improving the quality of the energy at a target is with a closed loop system having an element of feedback from the target site. Such a system is described in U.S. Pat. No. 3,731,103 entitled Adaptive Arrays issued May 1, 1973 to T. R. O'Meara. In this system a plurality of laser sources is directed at a target, each being phase modulated at a different frequency. Signals reflected from the target are collected and processed so that each laser source is preconditioned in order to yield the phase relationship desired at the target. The system involves multiple transmitting surfaces, a receiving surface and suitable equipment to condition the radiation leaving each transmission surface in accordance with the information being received at the collecting surface.

Another system involving adaptive optics was discussed at the Woods Hole Summer Seminar held in August, 1967 and published by the National Academy of Sciences in AD680797 as the Perkin-Elmer Program in Active Figure Control by D. A. Markle. The article describes a closed loop, servocontrolled system which was developed for use with a large telescope. A major problem being overcome with this system is the imprecision of manufacture inherent in a large surface collector. Basically, the overall telescope surface is so large and the variation from an ideal surface which is allowable in order to maintain the sensitivity desired is so small that significant changes must be made to the surface after manufacture and at various times thereafter. The main elements of the system comprise an optical sensor which looks at the surface of the telescope, an error computer, and some control logic to manipulate actuators which correct for tilt and axial misalignment of the telescope surface.

SUMMARY OF THE INVENTION

An object of the present invention is to compensate for undesired phase distortions in the laser beam in order to improve the quality of the beam arriving at a target.

According to the present invention, the precise contour of a deformable mirror having a single contiguous surface is adjusted with a control assembly having a computer which receives from a sensor assembly real time data on the actual contour of the mirror, compares these data with stored and other input data and provides individual correction signals for each of a plurality of actuators attached to the deformable mirror. The control assembly comprises a computer for comparing information from the sensor system with stored data to produce correction signals which are amplified before being applied to the actuators on the mirror. The sensor assembly comprises a laser and interferometer which produces a first image of the mirror surface at an apertured photomultiplier which acts as a reference, and a second image of the mirror surface at a scanning image dissector, the photomultiplier and dissector being connected to a sensor signal processor which determines displacement of particular locations on the mirror. The transmission of a laser beam to a target in accordance with the present invention includes determining an initial contour for the surface of a deformable mirror, applying the contour to the mirror surface, transmitting the laser beam to the target by reflection from the mirror surface, monitoring the contour of the surface during transmission, comparing the actual contour of the mirror surface with the initial contour, generating correction signals in response to differences between the actual and the initial contours and causing suitable motion to the mirror surface to drive the actual contour to more closely approximate the initial contour.

One of the features of the present invention is the computer control of a plurality of individual mirror actuators which are attached directly to a deformable mirror. Variations in the mirror surface are detected interferometrically with the application of an auxiliary beam to the mirror surface. The invention is open loop with respect to both the power laser and the ultimate target site although it is closed loop with respect to the deformable surface of the mirror. The actuation of the mirror surface is accomplished in a closed loop controller which includes the sensor laser, the control computer, the signal amplifiers and the mirror actuators. Although the device is useful on mirrors subjected to laser beams of very high energy density, the system is operated completely independent of the main beam. The mirror surface is continuous and deformable due to the action of a plurality of individual actuators.

The mirror control system in accordance with the present invention is capable of making real time corrections to the surface of the mirror. As a result, a laser beam having a near diffraction limited spot size and high intensity at a target is possible. Such systems are particularly useful with lasers of very high power energy density. In addition, the technique involved does not absorb any power from the main beam which is being reflected from the controlled mirror surface. Further, since the technique does not involve sampling the primary beam, the optical characteristics of the beam are not perturbed in any way. The system is able to respond to predetermined as well as test data affecting the preferred contour of the mirror surface.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 1 is a simplified schematic of a generalized control system in accordance with the present invention;

FIG. 2 is a simplified schematic of the control assembly in the system;

DESCRIPTION OF PREFERRED EMBODIMENTS

Figure 3:
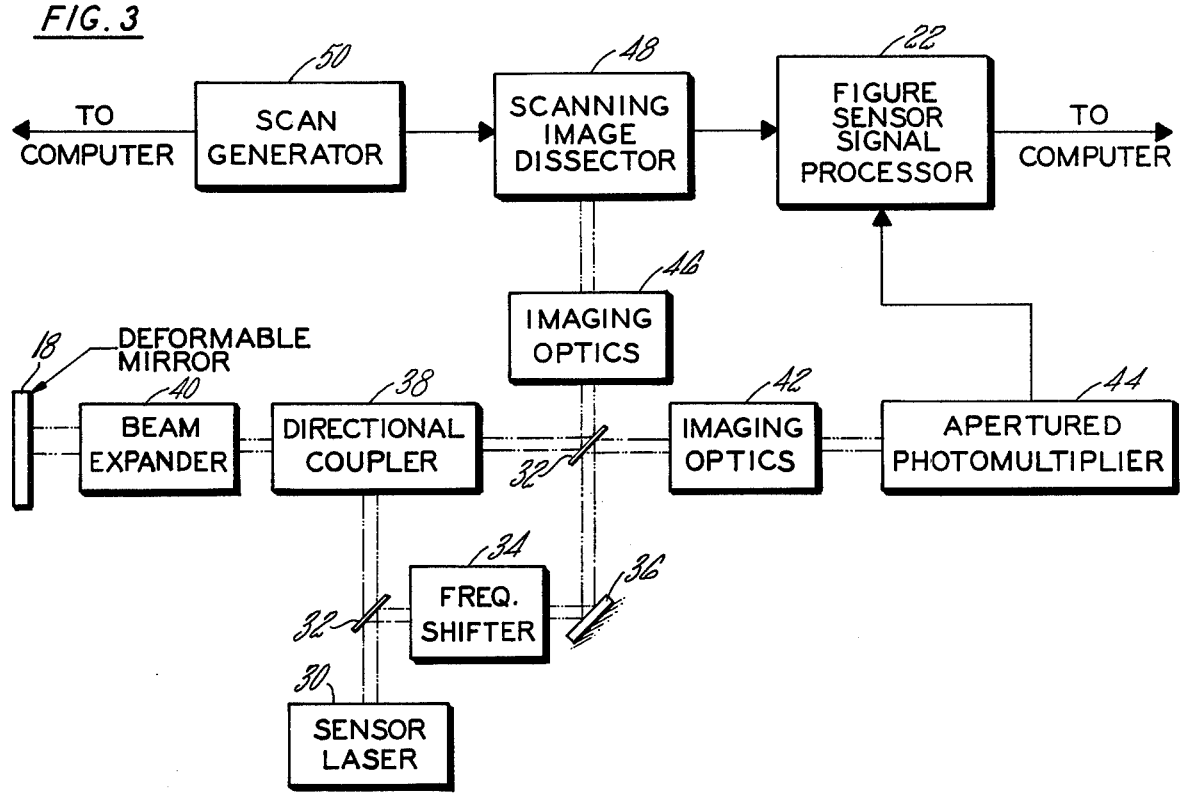
FIG. 3 is a simplified schematic of the sensor assembly in the system.

A simplified schematic of a general control system 10 in accordance with the present invention is shown in FIG. 1. The major elements comprising the control system include a sensor assembly 12, the control assembly 14, mirror actuators 16 and a deformable mirror 18. The control assembly which is discussed in more detail hereinafter contains several major components as shown in FIG. 2 including a computer 20, a data processor 22, a source of stored data 24, a source of optional data 26, and signal amplifiers 28. Similarly, the sensor assembly comprises a sensor laser 30, beam splitters 32, a frequency shifter 34, a folding mirror 36, a directional coupler 38, a beam expander 40, a first set of imaging optics 42, an apertured photomultiplier 44, a second set of imaging optics 46, a scanning image dissector 48, a scan generator 50 and a data processor 22 as shown in FIG. 3.

Figure 4:
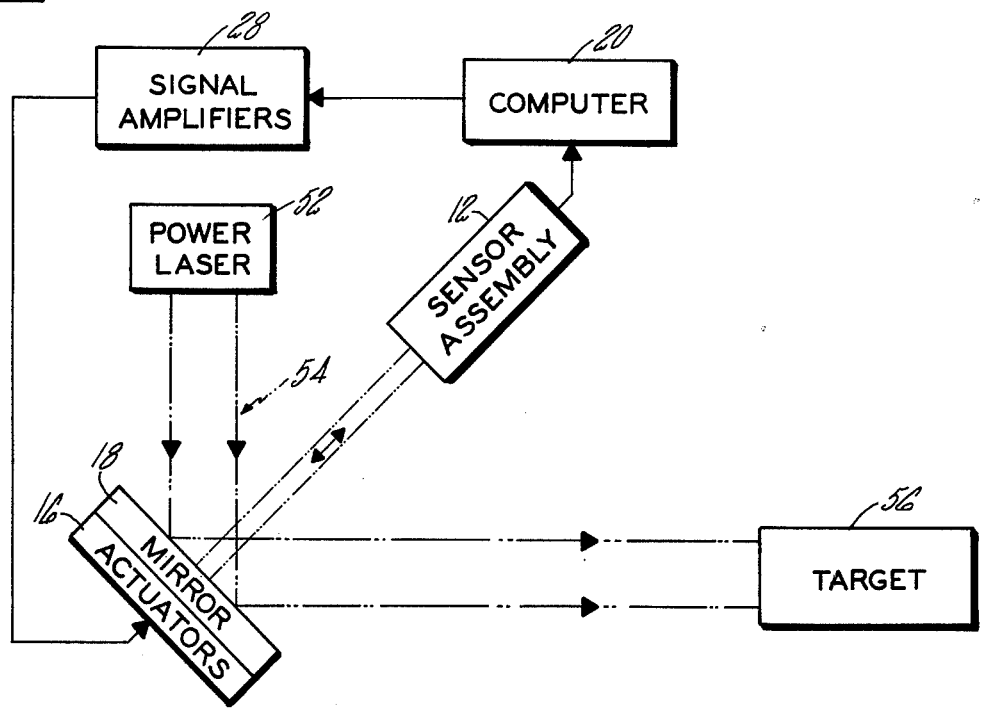
FIG. 4 is a simplified schematic of an overall system in accordance with the present invention with a power laser and a target.

Conceptually, the operation of a device such as a gas dynamic laser or a chemical laser which is capable of providing high quantities of output power and incorporates a mirror control system in accordance with the present invention is not difficult to understand. The deformable mirror frequently has a flat reflective surface and is constructed with a thin reflective surface which is readily cooled by flowing liquids adjacent therethrough. A power laser 52 which provides an intense beam 54 of laser radiation is directed onto the mirror surface enroute to an ultimate target 56. The characteristics of the beam 54 at the target are either observed or estimated for a variety of operating conditions and the precise surface contours of the mirror corresponding to such characteristics are determined and recorded prior to the practical application of the present invention. With such information stored in the control assembly, the power laser is activated and directed onto the mirror surface which has been set to a predetermined contour by the control assembly. As the mirror contour deviates from this preset condition, as is the case under actual operating conditions, the sensor assembly observes such deviation and passes the information along to the control assembly which in turn generates correction signals which are then amplified and fed to the appropriate mirror actuators to effect a suitable change in the surface contour of the mirror. This overall system as discussed is shown schematically in FIG. 4.

In order to provide the near diffraction limited transmission of laser power from a source to a target in accordance with the present invention which is from a fundamental consideration an open loop system, the precise contour of the deformable mirror which compensates for phase disturbances regardless of whether they are occurring during the generation of the laser beam or during the transmission of the beam must be predetermined. For optical systems using high power laser beams, considerations such as hysteresis in the actuators, mirror surface heating and mechanical drift of the mirror train affect the ability to set and monitor the mirror contour open loop. In some applications, theoretical analysis and computation are suitable for essentially predicting the detrimental effects which would otherwise detract from an ideal transmission of a laser beam. When possible, such predictions are made and become the basis for the surface contour setting on the mirror surface. Alternatively, an actual laser system of interest is operated and the output beam is reflected off a test mirror while suitable measurements are made regarding the quality of the reflected beam in the far field. The experimental information derived from such techniques can be used in place of or in combination with the analytical analysis of this system to determine preferred surface contours for the deformable mirror.

After the required information on the mirror contour is available, it is loaded into the stored data 24 which has capacity to retain a complete map of the desired contour and in some applications, a number of different maps for the mirror.

The stored data are available to the computer 20 which compares such data against suitable input signals from the data processor 22 with the help of coordinate information from the scan generator, both of which are discussed further hereinafter. Any differences between the signals representing the stored data and these input signals causes the computer to produce an appropriate correction signal representative of the difference, and the correction signals are fed to the signal amplifiers. The computation described is accomplished for discrete locations on the deformable mirror surface which in one of the embodiments of the practice of the present invention involved fifty two separate locations although the precise number is entirely arbitrary and is a function of such factors as the size of the deformable mirror surface and the degree of complication which is considered acceptable.

The correction signals produced by the computer are fed to the signal amplifiers which modify the relatively low level signals to the suitable high voltage necessary to drive the piezoelectric actuators attached to the deformable mirror. Each control point on the mirror has a corresponding actuator which in turn is associated with an individual signal amplifier so that for the mirror surface having fifty two control points, there are also fifty two individual signal amplifiers each of which is feeding to only its associated actuator.

In some instances, additional corrections are made by loading in optional data from sources outside the essential system as described in FIG. 1. Under special circumstances information from a laser wave front analyzer is inputed as optional data and the computer receives these data and processes them in the same manner as is used with the stored data. For certain conditions, actual target derived data may be used as optional data.

The sensor system shown as a generalized schematic in FIG. 3, uses a source laser which typically provides a low power output beam in the visible spectrum. The output from the sensor laser is split into two beams, one split beam being frequency shifted for subsequent optical heterodyning while the second of the split beams passes through the directional coupler and after having been increased in diameter by the beam expander is directed onto the surface of the deformable mirror. The beam is reflected back along its incident path reduced in diameter by the same optics that expanded the beam and passed through the directional coupler which causes the reflected beam to continue on in a straight line path rather than back toward the sensor laser. This reflected beam is mixed at the beamsplitter with the portion of the beam from the sensor laser which has been frequency shifted creating a heterodyned beam which is also bifurcated. One portion of the heterodyned beam passes though the first imaging optics 42 which focuses the beam and forms an image of the mirror surface at the photocathode of the apertured photomultiplier 44.

The apertured photomultiplier monitors one preselected location on the deformable mirror. This location is the reference point against which the remaining control points on the mirror surface are compared. The output from the photomultiplier is a sinusoidally varying electrical signal which is representative of the fringe interference for the reference point caused by the heterodyning in the interferometer of the sensor radiation reflected from the mirror and the frequency shifted beam.

The other portion of the split heterodyned beam is passed through a second set of imaging optics 46 which forms a second image of the deformable mirror, this one on the photocathode surface of the scanning image dissector. The scanning image dissector is performing a function similar to the apertured photomultiplier although the scanning dissector looks sequentially at all the control points on the deformable mirror surface. The output from the dissector is a sinusoidally varying electrical signal similar to the output from the apertured photomultiplier and is representative of the displacement of each of the control points on the mirror surface.

The scan generator inputs to both the computer and the scanning image dissector and in one of the embodiments constructed and operated at two hundred frames per second. The generator simultaneously provides information on the XY coordinates for any particular control point on the mirror surface to both the computer and the scanning image dissector such that when the Z displacement for a particular control point on the mirror is determined with respect to the reference control point, the computer is able to discern which control point on the mirror map the Z displacement represents. The computer is then able to compare a given displacement value with the comparable value available from the stored data.

The data processor compares the phase between the output signals from the scanning image dissector and the apertured photomultiplier and provides an electrical signal to the computer which indicates the precise displacement of a control point on the mirror surface in the Z direction for a particular XY coordinate.

The data processor transfers information to the computer at a rate of approximately 10,000 location points per second for the system using 52 actuators and two hundred scan cycles per second. The computer has some practical limitations which prevent the full utilization of each input in real time since a process time approaching seven milliseconds is involved and the net result is a cycle time of this duration.

The full response of an individual actuator to an amplified drive signal from the computer is modified by the electrical band width of its amplifier which as a practical matter is approximately thirty Hertz. Thus the ability of the system to compensate for a perturbation introduced at the surface of the mirror is approximately fifteen Hertz and frequencies less than this, changes on the mirror can be corrected with the closed loop control. Surface changes occurring at a faster rate cannot be corrected. With improved figure sensor and hard-wired electronics, the mechanical resonance of the deformable mirror limits the closed loop response to three hundred Hertz.

Although this invention has been shown and described with respect to a preferred embodiment thereof, it should be understood by those skilled in the art that various changes and omissions in the form and detail thereof may be made therein without departing from the scope of the invention.

Having thus described a typical embodiment of our invention, that which we claim as new and desire to secure by Letters Patent of the United States is:

1. The method of transmitting the laser beam from a source and having the beam arrive at a target with desired optical characteristics using an active mirror system including the steps of:

establishing the phase perturbations which the beam has upon arrival at the target under a given set of conditions;

determining the corrective contour of a reflective surface which would produce offsetting phase effects to the beam;

arranging a mirror assembly having a deformable reflective surface in the optical path of the beam;

setting the actual contour of the surface to conform with the contour which provides the offsetting phase effects to the beam;

transmitting the beam from the source to the target by reflection off the deformable surface;

monitoring the contour of the surface of the deformable mirror with an auxiliary laser during actual transmission of the beam;

comparing continuously on a real time basis the actual contour of the surface with the corrective contour initially determined; and adjusting the actual contour to more closely match the initially determined contour.

* * * * *